Figure 1:
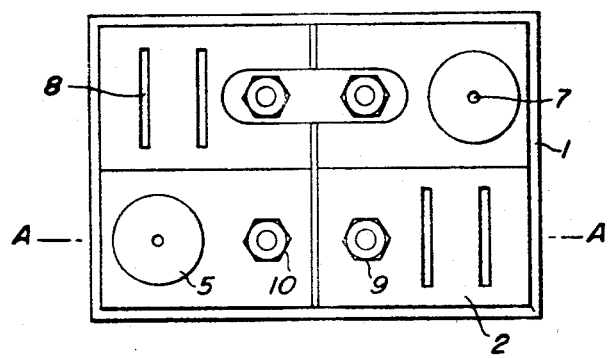

3,392,057
AIR CELL INCLUDING ZINC ANODE AND ALKALI ZINCATE ELECTROLYTE

Eiichi Sakagami, Kobe, Masao Ozaki, Moriguchi-shi, Fukutaro Mizukami, Osaka, Jun Watanabe, Amagasaki-shi, Tomizo Shiramoto, Osaka, Naohiro Furukawa and Rikio Iida, Moriguchi-shi, and Kazumitsu Jibiki, Hirakata-shi, Japan, assignors to Matsushita Electric Industrial Co., Ltd., Osaka, Japan, a corporation of Japan
Continuation-in-part of applications Ser. No. 820,797 and Ser. No. 820, 798, June 16, 1959. This application Aug. 19, 1963, Ser. No. 303,034
8 Claims. (Cl. 136—86)

This application is a continuation-in-part of co-pending application Ser. No. 820,798, filed June 16, 1959 and Ser. No. 820,797, filed June 16, 1959; both are now abandoned.

This invention relates to a new air cell, and more particularly to an air cell wherein the anode, cathode and electrolyte are active carbon, porous zinc made of zinc powder and a 35 to 45 percent solution of alkali zincate, respectively, the reaction of the said air cell being;

$$Zn + H_2O + O \rightarrow Zn(OH)_2$$

Air cells are known wherein the anode, the cathode and the electrolyte are cast zinc, active carbon and a solution of caustic soda respectively. The electromotive reaction of such cell is given by the following equation:

$$Zn + 2NaOH + \tfrac{1}{2}O_2 \rightarrow Na_2ZnO_2 + H_2O + 2e^- \quad (1)$$

Theoretically, this cell requires 1.22 g. of zinc and 1.49 g. of caustic soda per one ampere hour, but practically it consumes much more, namely 2 g. (0.28 cc. by volume) of zinc and 1.4–1.6 g. (7–8 cc. of 20 percent NaOH solution) of caustic soda. Consequently, the electrolyte occupies a prohibitively large volume of the cell. Thus, the discharge capacity per one cubic centimeter of the cell volume is $7 \times 10^{-2}$ ah./cm.$^3$ and the discharge capacity per one cc. of the electrolyte solution is 0.12 ah./cc. and it is impossible to have a larger space efficiency than these values under the condition necessary for the above indicated reaction. If large capacity is required, the cell volume must be made larger.

In order to overcome the above disadvantage, it has been proposed to reduce the amount of caustic soda, but in this case a dense oxidized film is formed on the surface of cast zinc, which renders the zinc impassive. This reduces the efficiency of zinc utilization and accordingly fails to obtain a cell of good performance.

For the purpose of removing the above drawback, a porous zinc, compression-molded from zinc powder, was proposed for the anode.

In this case, the porosity of zinc anode makes the contact surface of reaction so large that even if a compact zinc oxide film is formed, it does not grow to such a great thickness as to decrease the passing of electric current. Thus it is now possible to bring most of the zinc into an effective electromotive reaction and the defect of the passive state is obviated. However, the increased efficiency of zinc utilization induces the following other drawback.

As the electrolyte of caustic soda solution is consumed and deteriorated progressively because of the electromotive reaction shown in Equation 1, both the concentration and the amount of the electrolyte decrease. This results in an increase in the concentration of sodium zincate in solution, thereby causing the discharge voltage to decrease. When the caustic soda is consumed completely leaving unreacted zinc, the electromotive reaction takes the following form:

$$Zn + H_2O + O \rightarrow Zn(OH)_2 \rightarrow ZnO + H_2O \quad (2)$$

Thereafter, consumption of electrolyte and change in concentration cease and the reaction shifts to zinc oxide formation at the anode. Therefore the electromotive reaction consists of two reactions and discharge voltage changes suddenly at the transition point which causes a shift of electromotive force as shown in Equations 1 and 2. Even when the reaction proceeds according to Equation 1, gradual consumption and deterioration of electrolyte results with a consequent reduction in activity and lowering of discharge voltage. These disadvantages are drawbacks in this method.

In the method of this invention, of the essential factors of cell construction i.e. the anode, the cathode and the electrolyte, only the anode is made of material which is consumed and deteriorated by the reaction, while the other two are made of materials which are not consumed or deteriorated by the reaction.

The object of this invention is thus to provide an air cell which has a large capacity but small size and minimized weight, i.e., an air cell having high volume efficiency and high weight efficiency.

Another object of this invention is to provide an air cell having a smooth and constant discharge characteristic.

Another object of this invention is to provide an air cell having low self-consumption.

Still another object of this invention is to provide an air cell which is easy to handle and maintain, and is superior in heat-resistant, cold-resistant and humidity-resistant properties.

Figure 2:
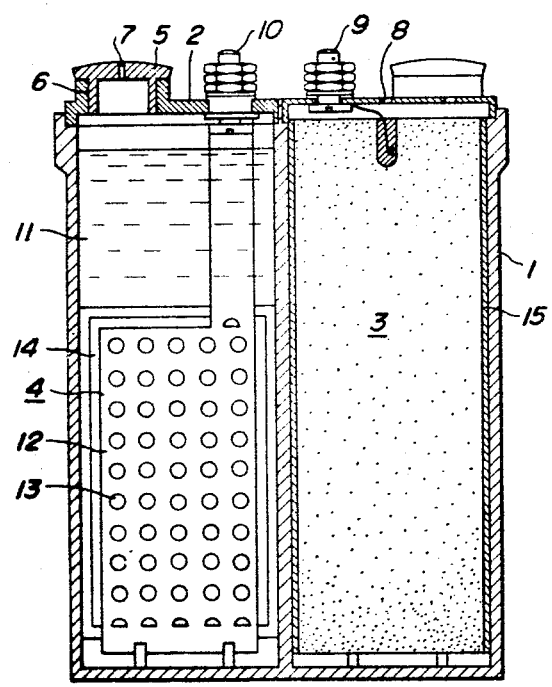
Figure 3:
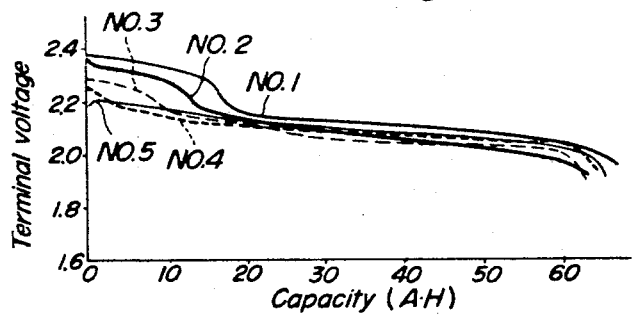
Figure 4:
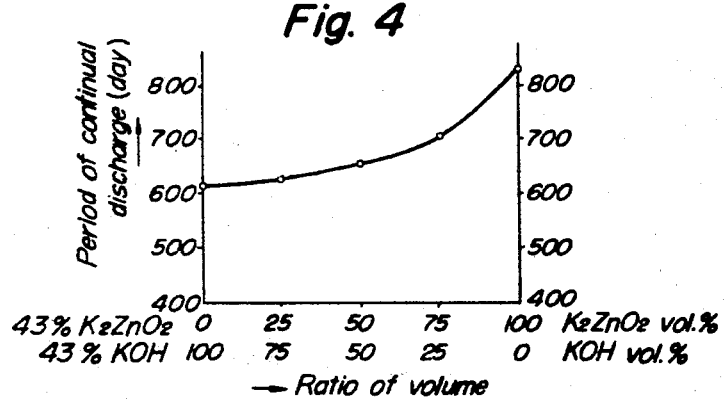
Figure 5:
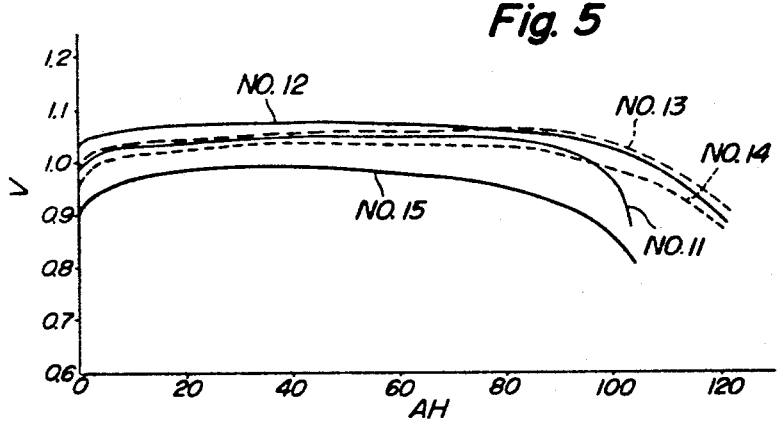
Figure 7:
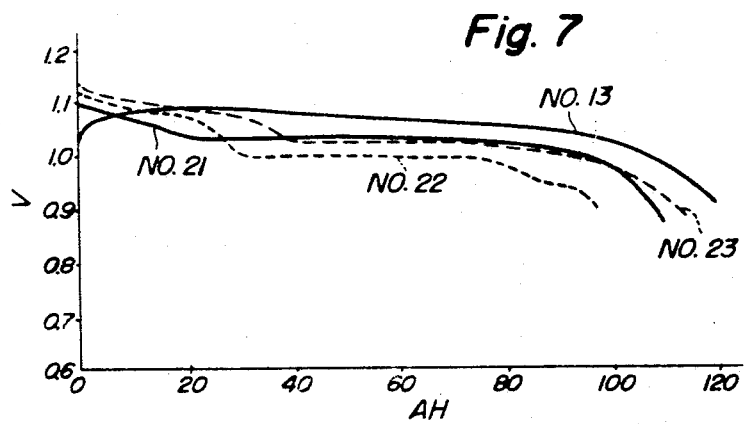
Figure 6:
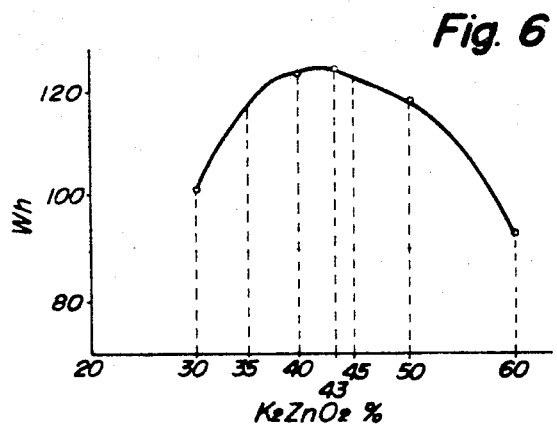
Figure 12:
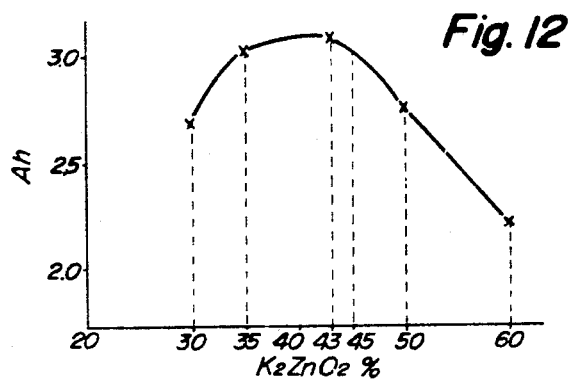
Figure 8:
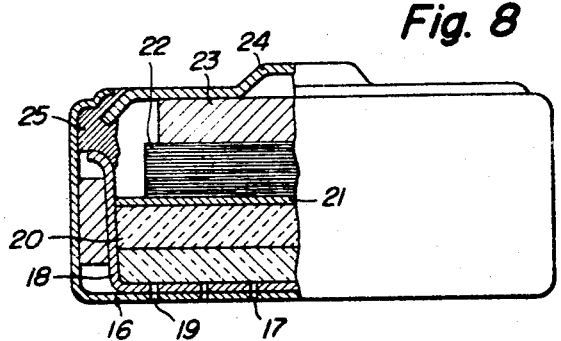
Figure 9:
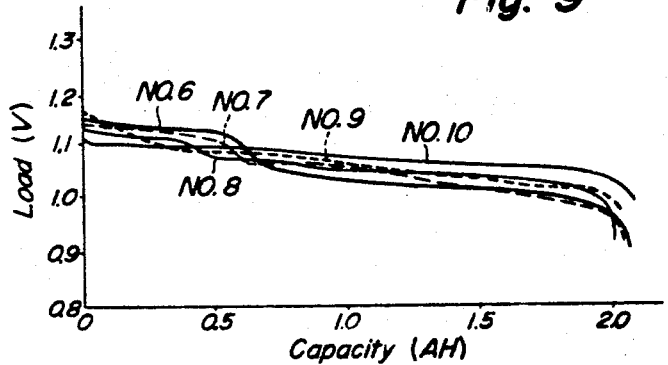
Figure 10:
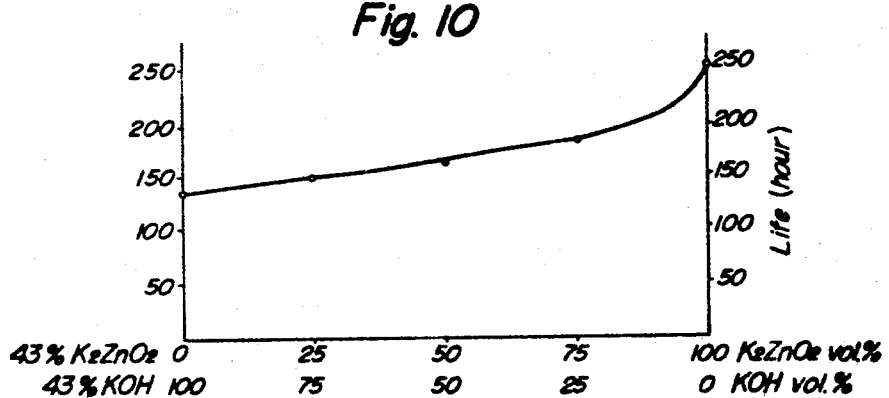
Figure 11:
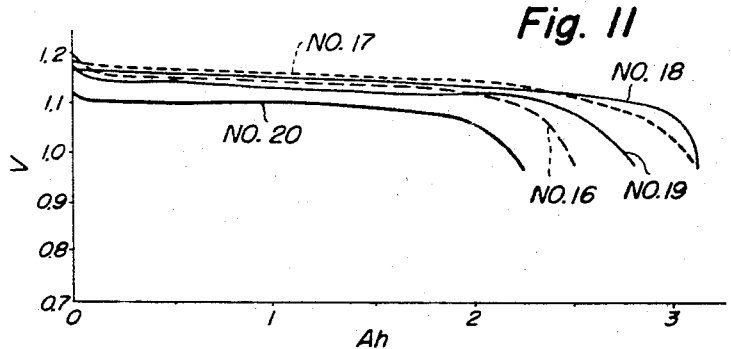
Figure 13:
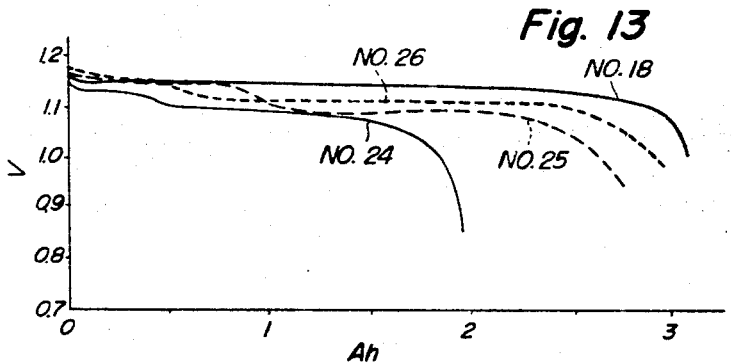
Figure 14:
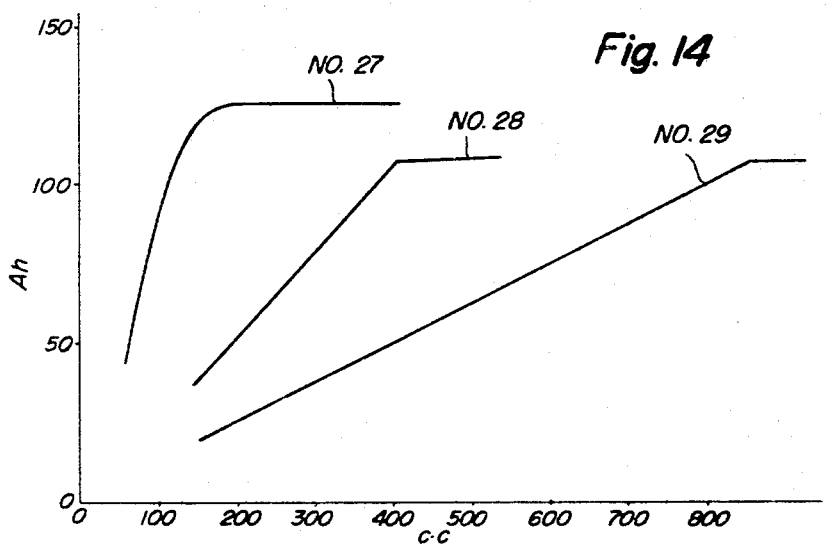

In the accompanying drawings, FIGURE 1 is a plan-view of AWZ-2-60 type air wet cell, one embodiment of an air cell of this invention, FIGURE 2 is a cross-section view along the line A—A of FIGURE 1, FIGURE 3 is the characteristic curve of continuous discharge of this air wet cell at 20° C. and 100 ma., FIGURE 4 is the characteristic curve of intermittent discharge for 4 minutes after stoppage of 56 minutes in this air wet cell at room temperature and 50Ω, FIGURE 5 is the characteristic curve of continuous discharge at 20° C. and 200 ma. in various concentrations of $K_2ZnO_2$ of this air wet cell, FIGURE 6 is the curve which shows the relation between $K_2ZnO_2$ concentration and capacity of this air wet cell, FIGURE 7 is the characteristic curve of continuous discharge at 20° C. and 200 ma. when the conventional electrolyte solution is used in the air wet cell, FIGURE 8 is the side sectional-view of another type of air dry cell embodying a feature of this invention, FIGURE 9 is the characteristic curve of continuous discharge of this air cell at 20° C. and 20 ma., FIGURE 10 is the characteristic curve of intermittent discharge for 4 hours after stoppage for 20 hours at 8 ma. in this air cell, FIGURE 11 is the characteristic curve of continuous discharge at 20° C. and 20 ma. in this air dry cell, FIGURE 12 is the curve which shows the relation between $K_2ZnO_2$ concentration and capacity of this air dry cell, and FIGURE 13 is the discharge curve at 20° and 20 ma. when the conventional electrolyte is used. FIG. 14 shows curves of capacity to volume of an electrolyte when 200 g. of zinc are used for the anode of an AWZ-2-60 type air cell, in which curve No. 27 uses as electrolyte a 43% aqueous $K_2ZnO_2$ solution, No. 28 a 43% aqueous $K_2ZnO_2$ solution containing $Ca(OH)_2$ to inhibit denaturation of KOH owing to $CO_2$ in air and No. 29 a 43% aqueous KOH solution.

In the cell of this invention, the reaction of the electrodes is:

$$Zn \rightarrow Zn^{++} + 2e \quad \text{at the anode}$$
$$O + H_2O + 2e \rightarrow 2OH^- \quad \text{at the cathode}$$

accordingly, as expressed by the equation $$Zn + O + H_2O \rightarrow Zn(OH)_2 \rightleftharpoons ZnO + H_2O \quad (2)$$

Zinc oxide is formed on the anode at discharge. As obvious in the Equation 2, the electrolyte of the cell of this invention does not participate in the electromotive reaction. Accordingly there is no consumption of electrolyte, or change in concentration and deterioration does not occur during the course of the reaction. It merely performs the function of a "transmitter" of ions and electrons. Consequently, the air cell of the present invention does not need such a large amount of electrolyte as conventional ones, but only the minimum amount of electrolyte to contact electrochemically the active carbon cathode to the porous zinc. This is shown in FIG. 14.

The electrolyte

As electrolyte, an aqueous solution of alkali zincate such as sodium zincate or potassium zincate is used. Though a concentration of from 35 to 40 percent by weight is preferable as shown in FIGURES 6 and 12, a concentration of 43 percent by weight is most preferred.

Alkali zincate undergoes the following hydrolysis reaction 3:

$$K_2ZnO_2 + 2H_2O \rightleftharpoons 2KOH + Zn(OH)_2 \qquad (3)$$

It was discovered by the present inventor that so long as the concentration of alkali zincate is in the range of 30–50 percent (by weight), 87 percent (by weight) of alkali zincate in solution does not undergo hydrolysis, i.e. only 13 percent (by weight) of alkali zincate undergoes hydrolysis and at this point equilibrium is established in the aqueous solution.

Consequently in a 35–45 percent (by weight) aqueous solution of alkali zincate, there exists very small quantity of hydroxyl ion which maintains the equilibrium of hydrolysis. When the cell is constructed with this electrolyte, the reaction shown in Equation 1 does not occur but reaction 2 proceeds smoothly, at all times, without variation in concentration and without consumption of electrolyte.

A 43 percent aqueous solution of potassium zincate is made, for example, by dissolving 19.9 g. of ZnO in 27.4 g. of KOH and stirring after addition of 52.7 g. of water.

It is desirable to add a soluble phosphate salt to the electrolyte. As the phosphate salt, potassium phosphate, especially potassium polyphosphate is preferred. As for the air cell, only the necessary amount of atmospheric air for depolarization penetrates into the cell during the discharge period, but atmospheric oxygen diffuses from the cathode into the cell during storage and the anode, thereby, suffers from oxidative corrosion.

Consequently, the cell is self-consuming, and the cell can be stored only short periods of time, e.g. within about a month, the cell will be completely self-consumed. However when a phosphate salt is added to the electrolyte, it adheres by surface active action on the surface of the zinc anode and forms a molecular film which protects the zinc, thereby, oxidative corrosion is prevented and the battery can be stored for long periods of time, e.g., about 5 months.

When the amount of phosphate is over 3 percent of the electrolyte by weight, internal resistance of the cell increases, thereby discharge characteristic goes down. When it is less than 0.3 percent by weight, it is not effective. Thus the range from 0.3 to 3 percent is effected. When using potassium polyphosphate, about 1 percent is suitable. For purpose of comparison, the characteristics at 50 ma.-continuous discharge of ADZ-2 type air dry cell are shown in Table 1 in two cells, i.e. cell A with 1 percent (by weight) of potassium polyphosphate based on the alkali zincate electrolyte and cell (a) without adding the same.

TABLE 1

| Discharge hours | 0 | 10 | 15 | 16 | 70 | 80 |
|---|---|---|---|---|---|---|
| A -- Just after fabrication (voltage) | 1.14 | 1.13 | 1.13 | 1.13 | 1.08 | 0.8 |
| After exposure to air kept on shelf for 100 days (voltage). | 1.17 | 1.13 | 1.13 | 1.10 | 1.05 | 0.8 |
| a --- Just after fabrication (voltage) | 1.15 | 1.13 | 1.13 | 1.13 | 1.10 | 0.9 |
| After exposure to air kept on shelf for 100 days (voltage) (in storage). | 1.13 | 0.87 | | | | |

Instead of soluble phosphate, soluble silicate is also suitable. As the soluble silicate, potassium silicate is generally used and the preferred amount is 0.3–3 percent of the electrolyte by weight.

Continuous discharge performance (terminal voltage V) at 50 ma. obtained after 100 days storage exposed in the air of cell (B) containing 1% (by weight) of potassium silicate per potassium zincate electrolyte, and cell (b) without adding the same in AD-2 type air dry cell is shown in Table 2.

TABLE 2

| Discharge hours | 0 | 10 | 20 | 30 | 70 | 80 |
|---|---|---|---|---|---|---|
| B -- Voltage, V | 1.12 | 1.10 | 1.08 | 1.07 | 1.05 | 0.75 |
| b ------ do | 1.13 | 0.81 | | | | |

In lieu of phosphate or silicate, a water-soluble compound having an acrylic radical e.g. polyacrylic acid, or potassium or sodium salt polyacrylic acid can also be employed as additive.

In contrast to the above-mentioned phosphate or silicate, these compounds make the deposition or segregation of oxide on the surface of the zinc anode so soft that the tendency of making the anode impassive can be avoided, thereby improving the discharge effect. The preferred amount of compound is 1–3 percent by weight. Polymers of these types of compounds, especially polymers having a molecular weight of 50,000, are preferable to the monomeric compounds. The characteristics (terminal voltage V) of 400 ma.-continuous discharge at 20° C. in AWZ-2-60 air wet cell are shown in the table where, in cell (C), 3 percent by weight of sodium salt powder of polyacrylic acid (polymerization degree 50,000) is added to the electrolyte of potassium zincate; in cell (C'), 3 percent of polyacrylic acid (polymerization degree 50,000) is added to the electrolyte of potassium zincate; in cell (C'), 3 percent of polyacrylic acid (polymerization degree 50,000) is used instead of sodium salt of polyacrylic acid of cell (C); and in the cell (c), only potassium zincate is used.

TABLE 3

| Discharge hours (H) | 0 | 100 | 200 | 300 | 400 | 500 |
|---|---|---|---|---|---|---|
| C -- Voltage V | 1.10 | 1.12 | 1.09 | 1.11 | 1.11 | 1.02 |
| C' ------ do | 1.00 | 1.10 | 1.09 | 1.08 | 1.07 | 0.97 |
| c ------ do | 1.10 | 1.13 | 1.11 | 0.98 | 0.83 | |

Table 4 shows the characteristic (terminal voltage) of ADZ-2 type air dry cell at a continuous discharge of 50 ma. and 20° C. of cell (D) in which the sodium salt powder of polyacrylic acid (polymerization degree 50,000) in an amount of 1 percent is added to alkali zincate electrolyte, cell (D') contains 1 percent of polyacrylic acid (polymerization degree 50,000) and cell (d) contains no additive.

TABLE 4

| Discharge capacity (AH) | 0 | 1 | 2 | 3 | 4 |
|---|---|---|---|---|---|
| D -- Voltage V | 1.14 | 1.14 | 1.13 | 1.10 | 1.08 |
| D' ------ do | 1.11 | 1.11 | 1.08 | 1.05 | 0.90 |
| d ------ do | 1.13 | 1.13 | 1.11 | 0.98 | |

In the case of an air dry cell, alkali zincate electrolyte which is absorbed by cellulosic material like cotton and pulp or those made into paste form by mixing with gelatinizing material to bring it into immobilized state, is used. For the purpose of gelatinizing, carboxy-methyl cellulose (polymerization degree 200–350) amounting to 11 percent of alkali zincate by weight is preferably used. This material does not decompose like starch and gelation by electrolyte and gives a gel which does not separate from the electrolyte while in use. When the polymerization degree of carboxymethyl cellulose is from 100 to 150, it must be used in large amounts, which tends to lower, discharge capacity and discharge voltage. When the polymerization degree is from 500 to 700, it decomposes into lower polymers, during storage, and therefore badly affects the preservation properties. The discharge characteristic of 50 ma.-continuous discharge at 20° C. in ADZ-2 type air dry cell are shown in the Table 5, where the cell E employs electrolyte layer prepared by adding 11 percent by weight of sodium carboxy methyl cellulose (polymerization degree 200–350) based on the potassium zincate, followed by heating at 60° C. under agitation and gelatination, and the cell (e) employs electrolyte absorbed in porous cotton cellulose.

TABLE 5

| Discharge capacity (AH) | 0 | 1 | 2 | 3 | 4 |
|---|---|---|---|---|---|
| E___ Voltage V | 1.15 | 1.12 | 1.12 | 1.09 | 0.90 |
| e_____do | 1.10 | 1.07 | 1.07 | 1.05 | 1.00 |

The characteristic of 50 ma.-continuous discharge (terminal voltage) of air dry cell after 5 months of storage is shown in Table 6 where the cell (F) has 11 percent of sodium carboxymethyl cellulose (polymerization degree 500–700) as a gelatinizing material, the cell (F') has the same amount of sodium carboxymethyl cellulose (polymerization degree of 200–350) and the cell (f) has the same amount of sodium carboxymethyl cellulose (polymerization degree 100–150).

TABLE 6

| Discharge capacity (AH) | 0 | 1 | 2 | 3 | 4 |
|---|---|---|---|---|---|
| F___ Voltage V | 1.08 | 0.84 | | | |
| F'_____do | 1.12 | 1.10 | 1.07 | 1.04 | 0.80 |
| f_____do | 1.02 | 1.01 | 0.70 | | |

The characteristic of 100 ma.-continuous discharge of AWZ-2-type air wet cell at 20° C. which employs the electrolyte prepared by admixing various amounts of 43 percent potassium hydroxide solution and various amounts of 43 percent $K_2ZnO_2$ aqueous solution in their volumetric ratio is shown in FIGURE 3. It is clear that when using only 43 percent $K_2ZnO_2$ therein obtained a smooth discharge characteristic. In the case of ADZ-2 type air dry cell at 20 ma.-continuous discharge (terminal voltage V) of 20° C., a 43 percent aqueous solution of $K_2ZnO_2$ gives a smooth discharge characteristic as shown in FIGURE 9.

These facts show that when a small amount of $OH^-$ exists which is formed from the hydrolysis of $K_2ZnO_2$ aqueous solution at equilibrium, only Equation 2 occurs which gives a very smooth characteristic, but when the amount of $OH^-$ is more than that formed from the hydrolysis of $K_2ZnO_2$, both Equations 1 and 2 occur, which does not give smooth characteristic because of voltage drop at the transition point of the two reactions.

FIGURE 4 shows the relation between days of discharge duration and volumetric ratio of admixing of 43 percent KOH aqueous solution and 43 percent $K_2ZnO_2$ aqueous solution in the AWZ-2-60 type of air wet cell when it is intermittently discharged at room temperature by connecting 50Ω resistance, followed by 56 minutes of stoppage. It is also clear that using only 43 percent $K_2ZnO_2$ aqueous solution gives excellent results.

FIGURE 10 shows the case of ADZ-2-type air dry cell wherein discharge is performed intermittently at 8 ma. for 4 hours, followed by 20 hours of stoppage. Also when using only a 43 percent $K_2ZnO_2$ aqueous solution the results are excellent.

The characteristics of 200 ma.-continuous discharge at 20° C. in the air wet cell of type AWZ-2-60 wherein the electrolyte concentration is varied, are shown in FIGURE 5. The relation between $K_2ZnO_2$ concentration and volume is shown in FIGURE 6. FIGURE 7 indicates the characteristic of 200 ma.-continuous discharge at 20° C. when the compositions of electrolyte varies according to Table 8 and are compared with conventional electrolyte. From 35 to 50 percent (by weight) is preferable, and 43 percent (by weight) $K_2ZnO_2$ concentration gives favourable result.

TABLE 7

| No | 11(16) | (17) | 12 | 13(18) | 14(19) | 15(20) |
|---|---|---|---|---|---|---|
| $K_2ZnO_2$ Concentration | 30 | 35 | 39 | 43 | 50 | 60 |

TABLE 8

| No | 13(18) | 21(24) | 22(25) | 23(26) |
|---|---|---|---|---|
| Composition | 43% $K_2ZnO_2$ | 37% KOH, 100 g. Zn, 16 g. | 88% KOH, 75 g. ZnO, 10 g. $H_2O$, 100 g. | 88% KOH, 100 g. ZnO, 16 g. $H_2O$, 100 ml. |

The characteristic of 20-ma.-continuous discharge at 20° C. and ADZ-2 type air dry cell are shown in FIGURE 11 when the concentration of the electrolyte varies, according to Table 7, and the relation between $K_2ZnO_2$ concentration and volume are shown in FIGURE 12. The characteristics of 20 ma.-continuous discharge at 20° C. are shown in FIGURE 13 when the compositions are varied according to Table 8 and are compared with conventional electrolyte. As for concentration of $K_2ZnO_2$, it is clear that from 35 to 45 percent by weight is preferable; 43 percent being the most preferred.

The anode

Porous zinc is used as the anode. The anode of this invention has a larger reaction surface area than conventional cast or rolled zinc, and accordingly it can support a heavy load. Since the electrolyte of this air cell is an aqueous solution of alkali zincate, the anode surface is covered by a dense film of zinc oxide produced in accordance with Equation 2. This passivates the anode and the cell life ends, leaving only unreacted zinc when cast or rolled zinc is used. However when porous zinc having a porosity of 30–70 percent is used the dense film of zinc oxide is avoided and the passage of electric current is not hindered. In other words, a greater part of the zinc is utilized in the electromotive reaction, thereby permitting a current density 20 times higher. As the porosity of the porous zinc is in equilibrium with volume increase due to discharge reaction, there is no apparent volume increase (outside volume). Even when the anode is immersed in the electrolyte, as the case of air wet cell, the fluctuation of liquid surface is slight and the electrolyte does not overflow from the cell. Even when the anode is in contact with the electrolyte, it does not cause leakage of electrolyte by compressing the electrolyte layer.

The anodes are fabricated as follows. First, the anode of the air wet cell will be explained.

Around a 20 mesh grid net composed of, e.g., zinc-plated iron wire of 1 mm. diameter, is fastened an iron frame, and 20–50 mesh zinc powder is compression molded by applying a pressure of 2000 lb./in.², placing the above-mentioned grid in the center, thereby giving better mechanical strength than when the zinc powder is simply compression molded. In another example, a tin-plated 50 mesh grid is inserted into a pocket made of porous glass cloth, zinc powder of 100–150 mesh is charged around the same grid, and while the whole body thus obtained is immersed in a solution containing 1 percent corrosive sublimate, 12 percent mercury (by weight) is added dropwise, and left for 4 hours to obtain an amalgam. In the thus obtained anode, mercury acts as a binder which binds the individual zinc particles and also the zinc particles to the grid. The porosity of this cathode is 50–60 percent.

A mixture of 100 parts by weight of 50–100 mesh zinc powder (10 percent of which is amalgamated) and 3 parts by weight of 50 mesh polystyrene is heated at 150° C. for 2 hours. While the polystyrene is in the molten state, the whole mixture is subjected to compression molding, thereby an anode having a porosity of 50–60 percent is obtained. Also when zinc powder of 100–300 mesh is baked at 350–410° C. for 4 hours under an atmosphere of hydrogen flowing at the rate of 0.5–0.6 l. (1 atm.)/cm.$^2$, an anode of 60–70 porosity is obtained. Further when zinc powder of 20–150 mesh is charged into the porous glass cloth pocket without applying pressure, an extremely porous, valuable, anode, i.e., non-compressing-non-molding anode, is obtained. Furthermore, when zinc powder which is immersed in a solution of resin inert to alkali, e.g., polyethylene or ethylcellulose, followed by evaporation of the solvent resulting in formation of porous resin film on the surface, is employed, the self-consumption during storage due to oxidation of zinc is reduced, thereby increasing the length of time the battery can be stored.

Table 9 shows the characteritsics of 100 ma.-continuous discharge at 20° C. in the air wet cell of type AWD-2-60 wherein the cell (G) employs an anode which is made by charging 70 g. of a mixture consisting of 100 parts of 50–100 mesh zinc powder (10 percent of which is amalgamated) and 3 parts of 50 mesh polystyrene powder into a holding frame having perforation of 2 mm. diameter, followed by heat-molding at 150° C. for 2 hours; the cell (g) employs cast zinc, the cell (G′) employs an anode made by compression-molding the 50–100 mesh zinc powder into the holding frame perforation of

TABLE 9

| Discharge capacity (AH) | 0.1 | 10 | 20 | 30 | 40 | 50 |
|---|---|---|---|---|---|---|
| G ____ Voltage V ____ | 1.11 | 1.11 | 1.09 | 1.08 | 1.07 | 1.05 |
| g ____ do ____ | 1.13 | 1.06 | | | | |
| G′ ____ do ____ | 1.09 | 1.08 | 1.04 | | | |
| G″ ____ do ____ | 1.11 | 1.10 | 1.07 | 1.05 | 1.03 | |
| G‴ ____ do ____ | 1.11 | 1.10 | 1.09 | 1.09 | 1.08 | 1.07 |

2 mm. diameter; the cell (G″) employs an anode made by inserting simultaneously the tin-plated iron terminal plate having perforation of 2 mm. diameter and zinc powder of 50–100 mesh into the glass cloth pocket; the cell (G‴) employs an anode made by charging zinc powder of 100–150 mesh baked at 350° C. into the holding frame having perforation of 2 mm. diameter.

Table 10 shows the characteristics of 50 ma. continuous discharge at 20° C. and 0° C. in the air wet cell

TABLE 10

| Discharge capacity (AH) | 0 | 10 | 20 | 30 | 40 | 50 | 60 |
|---|---|---|---|---|---|---|---|
| h ____ (20° C.) ____ | 1.22 | 1.20 | 1.20 | 1.19 | 1.19 | 1.19 | 1.16 |
| h ____ (0° C.) ____ | 1.12 | 1.11 | 1.03 | | | | |
| H ____ (20° C.) ____ | 1.17 | 1.18 | 1.17 | 1.16 | 1.15 | 1.15 | 1.12 |
| H ____ (0° C.) ____ | 1.03 | 1.09 | 1.08 | 1.07 | 1.07 | 1.06 | | of the type AWD–2–60, wherein the cell (H) employs an anode made by inserting simultaneously tin-plated iron terminal plate having perforation of 2 mm. diameter (for the purpose of allowing the electrolyte to penetrate easily) and amalgamated zinc powder of 20–50 mesh; the cell (h) employs porous zinc having 30 percent porosity which is made by compression molding the amalgamated 20–50 mesh zinc powder. The capacity (AH) of these cells are shown in Table 11.

TABLE 11

| ° C | 20 | 10 | 0 | −10 |
|---|---|---|---|---|
| h | 62 | 50 | 12 | 10 |
| H | 54 | 52 | 50 | 40 |

Although these anodes are made by compression molding, they break easily in the course of transportation or even in storage. Hence it is desirable to cover the surface with material which is inserted into the electrolyte but permeable to ions, for example, a net made of sodium carboxymethyl cellulose.

Next, a detailed description of the air dry cell anode is given.

By using a resin such as polyethylene oxide, polystyrene and ethylcellulose as binder, zinc powder is molded.

For example, 5 g. of 100–150 mesh zinc powder are added to 0.5 g. of 5 percent polyethylene oxide aqueous solution. When the mixture thus obtained is molded without applying pressure, there is obtained an anode of 60 percent porosity. In another example, a mixture of 100 parts of 50–100 mesh zinc powder (10 percent amalgamated) and 3 parts of 50 mesh polystyrene powder is molded by heating for 2 hours at 150° C. It is also possible to mix zinc powder with resin powder and mold without compression by heating at a temperature higher than the softening point of the same resin, the said resin being inert to the electrolyte, having binding properties and being gelatinisable when admixed with the electrolyte like sodium carboxymethyl cellulose powder.

When 50 g. of 20–25 mesh zinc powder, 1 g. of 100 mesh polystyrene powder and 2.5 g. of carboxymethyl cellulose are admixed, followed by heating at 150° C., there is obtained an anode of 55 percent porosity.

Similar to the case of the wet air cell, the anode is also made by baking the zinc powder.

When the gel type electrolyte is employed, it is favorable to disperse zinc powder homogeneously. This serves both as an anode and an electrolyte, thereby the cell is small, light, has a smooth voltage characteristic, increased electricity capacity, and can be stored for long periods of time.

Table 12 shows the characteristic of 50 ma.-continuous discharge (terminal voltage) at 20° C. in ADZ–2-type air dry cell, where the cell (i) employs an anode made by casting 2 percent amalgamated zinc; the cell (I) employs an anode which is made by compression-molding 20–50 mesh amalgamated zinc powder around a grid having perforations; the cell (I′) employs an anode made by compression molding 20–50 mesh 10 percent amalgamated zinc powder; the cell (I″) employs an anode made by dipping 100 parts of 20–50 mesh 10 percent amalgamated zinc powder in 10 parts of 5 percent alcoholic solution of ethylcellulose, followed by drying under vacuum; the cell (I‴) employs an anode made by charging 20–50 mesh 10 percent amalgamated zinc powder into the cell case and placing the electrolyte layer upon this; and the cell (I⁗) employs an anode made by heating a mixture comprising 100 parts of 10 percent amalgamated zinc powder (20–50 mesh) and 3 parts of 50 mesh polystyrene powder at a temperature of 150° C. for 2 hours, followed by molding.

TABLE 12

| Discharge volume AH | 0 | 1 | 2 | 3 | 4 |
|---|---|---|---|---|---|
| i | 1.10 | 1.00 | | | |
| I | 1.14 | 1.14 | 1.13 | 1.10 | 1.02 |
| I′ | 1.14 | 1.13 | 1.12 | 1.02 | 0.90 |
| I″ | 1.14 | 1.13 | 1.13 | 1.12 | 1.00 |
| I‴ | 1.10 | 1.10 | 1.08 | 1.06 | 1.03 |
| I⁗ | 1.15 | 1.14 | 1.14 | 1.12 | 1.10 |

Table 13 shows the characteristic of 50 ma.-continuous discharge at 20° C. (terminal voltage V) in ADZ–2-type air dry cell, where the cell (J) employs an anode made by baking 100–150 mesh zinc powder at 350° C.; and the cell (j) employs an anode made by compression molding 100–150 mesh zinc powder.

TABLE 13

| Capacity (AH) | 0 | 1 | 2 | 3 | 4 |
|---|---|---|---|---|---|
| J | 1.17 | 1.17 | 1.17 | 1.16 | 1.10 |
| j | 1.13 | 1.13 | 1.10 | 1.08 | 1.00 |

It is effective to use zinc powder, the surface of which is coated with porous resin.

Next, the anode, which is also the electrolyte, will be explained in detail.

When the ratio of the electrolyte to zinc powder is from 4.5:5.5 to 3:7 (by weight), there is no oxidative corrosion because each particle of zinc powder is in electrical contact with each other because they are surrounded by the electrolyte. Furthermore, with this ratio, discharge capacity is high and voltage characteristic is smooth, therefore it is the most favorable range. When the ratio is greater than aforementioned, internal resistance and discharge capacity decreases, in spite of an increase of load voltage. Moreover, storage performance is poor because the surface of zinc powder is not separated from oxygen in air by the electrolyte. When the ratio is smaller, internal resistance increases and both discharge voltage and capacity is poor.

For the anode-electrolyte, it is favorable to homogeneously mix 0.4 part of sodium carboxymethyl cellulose, having a polymerization degree of 200–350, 3.6 parts of 43 percent alkali zincate aqueous solution and 6 parts of 100~150 mesh zinc powder, 10 percent of which is amalgamated.

In Table 14 preservation characteristics of several kinds of ADZ–2 type air dry cell are given, where the cells K, K', K'' employ an anode-electrolyte, formed of 43 percent alkali zincate electrolyte gelatinized by sodium carboxymethyl cellulose of polymerization degree 200 to 350 and 100 to 150 mesh amalgamated zinc containing 10 percent of mercury, the ratio being varied according to Table 14; and the cell (k) employs a layer of 43 percent alkali zincate gelatinized by sodium carboxymethyl cellulose and porous zinc which is made by compression molding 100 to 150 mesh amalgamated zinc powder containing 10 percent mercury.

TABLE 14

| | Ratio of mixing (weight) | |
|---|---|---|
| | Electrolyte | Zinc powder |
| K | 5 | 5 |
| K' | 3.5 | 6.5 |
| K'' | 2 | 8 |

Instead of the above-mentioned cylinder, it is also desirable to fill the vacant space between the anode-electrolyte and the anode terminal with metal fiber cloth or plastic sponge which is resistant to the electrolyte, e.g. neoprene sponge.

The cathode

As the cathode, an active carbon electrode is used. In the air dry cell, the cathode absorbs oxygen in the air and acts as a depolarizer, the active carbon electrode must be porous so as to be air penetrable and also be waterproof to prevent leakage of the electrolyte.

The active carbon cathode, as aforementioned, acts as a depolarizer by absorbing oxygen in the air. In addition it is also an exhauster by making the gas pass through pores when the internal pressure of the cell is increased by the gas produced in the cell or by volume increase due to the discharge reaction. Leakage of the electrolyte is thus avoided.

One example of an active carbon cathode is as follows: 20 g. of active carbon mixed with a binder composed of 25 g. of polystyrene dissolved in 150 cc. benzene is compression molded. Thereafter the benzene is evaporated.

As another example, a mixture of 10 parts of charcoal powder, 3 parts of an inorganic activator and 4 parts of a binder (tar pitch) is molded, baked and treated with paraffin to make it water-proof.

On the surface of the cathode, which is in contact with the electrode, and is participating in the electromotive reaction, an ion-permeable separator is placed in order to isolate the deposit produced by the reaction from the anode. For this purpose glass fiber cloth or vinylon cloth is utilized.

The cell construction

The construction of AWZ–2–60 type air wet cell is shown in FIG. 1 and FIG. 2. In the drawing, 1 is a polystyrene cell divided into two parts, 2 is a cell cover, 3 is an active carbon cathode, 4 is a porous zinc anode, 5 is a stopper inserted in a hole 6 provided in the cell cover 2, 7 is a vent hole in the stopper 5, 8 is an oblong air hole on the cell cover 2, 9 is a cathode terminal, 10 is an anode terminal, 11 is 43 percent alkali zincate electrolyte, 12 is a grid having perforated holes 13, 14 is the porous

TABLE 15

| Month of storage | Sample | | | | | | | |
|---|---|---|---|---|---|---|---|---|
| | K | | K' | | K'' | | k | |
| | Voltage (V) | Appearance | Voltage (V) | Appearance | Voltage (V) | Appearance | Voltage (V) | Appearance |
| 2 | 1.30 | Normal | 1.32 | Normal | 1.35 | Normal | 1.29 | Normal. |
| 3 | 1.32 | do | 1.32 | do | 1.34 | do | 1.26 | Do. |
| 4 | 1.30 | do | 1.30 | do | 1.32 | do | 1.18 | Starting to leak. |
| 6 | 1.24 | Starting to leak. | 1.31 | do | 1.28 | do | | |

When the anode-electrolyte is used, the volume of zinc cathode expands during the discharge period, accordingly some vacant area is necessary. However if the electrolyte enters the vacant area, because of expansion of the zinc powder, the contact between the electrolyte layer and the cathode terminal or the contact between the electrolyte layer and the diaphragm becomes poor even by slight shaking, which causes an increase in internal resistance. If the anode-electrolyte is placed in an insulating material which is inert to the electrolyte, e.g. a netting cylinder made of polyvinylidene chloride, the bottom of this cylinder is so placed as to be in contact with the diaphragm of the carbon cathode, while the cylinder top is in contact with the anode terminal which is also serving as sealing plate, the expansion pressure of the zinc powder caused by discharge is dissipated through the net, and therefore, does not cause any pressure and, in addition, leads to a balanced internal resistance.

zinc layer, and 15 is the separator covering the surface of the anode 3.

The anode and the cathode are arranged in diagonal relation to one another in the two parts of the cell and are connected in series. If the surface of the grid, 12 is painted by resin solution which is made by dispersing zinc powder in epoxy resin, the self-consumption of the cathode and internal gas evolution are avoided.

The construction of ADZ–2 type air dry cell is shown in FIG. 8. In the drawing, 16 is a nickel-plated steel case having an air hole 17, 18 is a nickel-plated steel case having an air hole 19 which is connected with the air hole 17, 20 is an active carbon cathode, 21 is a separator, 22 is a 43 percent alkali zincate electrolyte layer which is immobilized by gelatinizing agent, 23 is a porous zinc anode, 24 is a sealing plate made of tin-plated steel and 25 is a packing for insulating the seal plate.

What is claimed is:
1. Air cell comprising a cathode, an electrolyte, and an anode which generate the following electromotive reaction:

$$Zn+H_2O+O \rightleftarrows Zn(OH)_2 \rightleftarrows ZnO+H_2O$$

said cathode comprising active carbon, shaped by a binder, and having an ion-permeable separator on the surface thereof which is in contact with the electrolyte, the anode comprising porous zinc having from 30 to 70 percent porosity, and said electrolyte comprising 35 to 45 percent alkali zincate aqueous solution, said anode being in contact with said electrolyte.

2. Air cell as claimed in claim 1 wherein the ion permeable separator on the surface of the cathode is selected from the group consisting of glass-fiber cloth and polyvinyl alcohol fiber cloth.

3. Air cell as claimed in claim 1, wherein the electrolyte contains soluble salt of phosphate in an amount of 0.3–3 percent by weight of said electrolyte.

4. Air cell as claimed in claim 1, wherein the electrolyte contains potassium polyphosphate in an amount of 1 percent by weight of said electrolyte.

5. Air cell as claimed in claim 1 wherein the electrolyte contains from 0.3 to 3 percent of soluble silicate based on the weight of the electrolyte.

6. Air cell as claimed in claim 1 wherein the electrolyte contains a water-soluble acrylic compound in an amount of 1–3 percent based on the electrolyte.

7. Air cell as claimed in claim 6 wherein the water-soluble acrylic compound is a polymer having a polymerization degree of about 50,000.

8. Air dry cell as claimed in claim 1 wherein carboxymethyl cellulose having a polymerization degree of 200 to 350 is employed as a gelatinizing material in an amount of about 11 percent, thereby rendering the electrolyte immobile.

References Cited
UNITED STATES PATENTS

| | | | |
|---|---|---|---|
| 858,862 | 7/1907 | Edison | 136—157 |
| 2,422,045 | 10/1947 | Ruben | 136—107 |
| 2,526,692 | 10/1950 | Ruben | 136—107 |
| 2,612,532 | 9/1952 | Heise et al. | 136—86 |
| 2,650,945 | 9/1953 | Herbert | 136—107 |
| 2,800,520 | 7/1957 | McGraw | 136—154 X |
| 2,848,525 | 8/1958 | Schumacher et al. | 136—102 |
| 2,941,909 | 6/1950 | Johnson et al. | 136—154 |

FOREIGN PATENTS

| | | |
|---|---|---|
| 148,397 | 9/1952 | Australia. |

ALLEN B. CURTIS, *Primary Examiner.*